(12) United States Patent
Jiang et al.

(10) Patent No.: US 9,607,619 B2
(45) Date of Patent: Mar. 28, 2017

(54) VOICE IDENTIFICATION METHOD AND APPARATUS

(71) Applicant: Huawei Device Co., Ltd., Shenzhen, Guangdong (CN)

(72) Inventors: Hongrui Jiang, Shenzhen (CN); Xiyong Wang, Shenzhen (CN); Junbin Liang, Shenzhen (CN); Weijun Zheng, Hangzhou (CN); Junyang Zhou, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 399 days.

(21) Appl. No.: 14/100,822

(22) Filed: Dec. 9, 2013

(65) Prior Publication Data
US 2014/0207460 A1     Jul. 24, 2014

(30) Foreign Application Priority Data

Jan. 24, 2013   (CN) .......................... 2013 1 0027326

(51) Int. Cl.
*G10L 15/00*     (2013.01)
*G10L 15/20*     (2006.01)
(Continued)

(52) U.S. Cl.
CPC .............. *G10L 17/20* (2013.01); *G10L 17/12* (2013.01)

(58) Field of Classification Search
None
See application file for complete search history.

(56) References Cited

U.S. PATENT DOCUMENTS 5,970,446 A * 10/1999 Goldberg ................ G10L 15/20
                                                                704/233
6,434,520 B1    8/2002 Kanevsky et al.
(Continued)

FOREIGN PATENT DOCUMENTS

CN          1708782 A    12/2005
CN        101320559 A    12/2005
(Continued)

OTHER PUBLICATIONS

Kawahara, "Speech Recognition," The Institute of Electronics, Information and Communication Engineers "Knowledge Base" ver. 1/1.7, pp. 1-26, $2^{nd}$ group, $7^{th}$ ed., $2^{nd}$ chapter, The Institute of Electronics, Information and Communication Engineers, Tokyo, Japan (2011).

(Continued)

*Primary Examiner* — Richemond Dorvil
*Assistant Examiner* — Thuykhanh Le
(74) *Attorney, Agent, or Firm* — Leydig, Voit & Mayer, Ltd.

(57) ABSTRACT

Embodiments of the present invention provide a voice identification method, including: obtaining voice data; obtaining a first confidence value according to the voice data; obtaining a noise scenario according to the voice data; obtaining a second confidence value corresponding to the noise scenario according to the first confidence value; and if the second confidence value is greater than or equal to a pre-stored confidence threshold, processing the voice data. An apparatus is also provided. The method and apparatus that flexibly adjust the confidence value according to the noise scenario greatly improve a voice identification rate under a noise environment.

10 Claims, 9 Drawing Sheets

(51) Int. Cl.
*G10L 15/08* (2006.01)
*G10L 17/00* (2013.01)
*G10L 17/20* (2013.01)
*G10L 17/12* (2013.01)

(56) References Cited

U.S. PATENT DOCUMENTS

| | | | |
|---|---|---|---|
| 6,735,562 B1 | 5/2004 | Zhang et al. | |
| 7,536,301 B2 | 5/2009 | Jaklitsch et al. | |
| 8,155,953 B2* | 4/2012 | Park | G10L 25/78 704/208 |
| 8,571,871 B1* | 10/2013 | Stuttle | G10L 13/033 704/260 |
| 2002/0049587 A1* | 4/2002 | Miyazawa | G10L 15/20 704/233 |
| 2002/0077813 A1* | 6/2002 | Erell | G10L 15/20 704/233 |
| 2003/0236664 A1* | 12/2003 | Sharma | G10L 15/08 704/251 |
| 2004/0002858 A1* | 1/2004 | Attias | G10L 21/02 704/226 |
| 2004/0093210 A1* | 5/2004 | Toyama | G10L 15/20 704/233 |
| 2004/0215454 A1* | 10/2004 | Kobayashi | G10L 15/142 704/231 |
| 2004/0260546 A1* | 12/2004 | Seo | G10L 15/20 704/233 |
| 2006/0074651 A1* | 4/2006 | Arun | G10L 15/22 704/233 |
| 2006/0116874 A1* | 6/2006 | Samuelsson | G10L 19/26 704/228 |
| 2006/0200345 A1 | 9/2006 | Kooiman | |
| 2007/0055519 A1* | 3/2007 | Seltzer | G10L 21/038 704/251 |
| 2007/0198269 A1* | 8/2007 | Braho | G10L 15/06 704/270 |
| 2007/0233476 A1* | 10/2007 | Koshiba | G10L 15/20 704/231 |
| 2007/0276662 A1 | 11/2007 | Akamine et al. | |
| 2008/0167868 A1* | 7/2008 | Kanevsky | G10L 15/20 704/233 |
| 2008/0228478 A1* | 9/2008 | Hetherington | G10L 25/87 704/233 |
| 2009/0030679 A1* | 1/2009 | Chengalvarayan | G10L 15/20 704/233 |
| 2009/0043570 A1* | 2/2009 | Fukuda | G10L 15/20 704/211 |
| 2009/0177468 A1* | 7/2009 | Yu | G10L 15/02 704/233 |
| 2010/0088094 A1* | 4/2010 | Wang | G10L 25/78 704/233 |
| 2011/0137649 A1* | 6/2011 | Rasmussen | H04R 25/356 704/231 |
| 2011/0208520 A1* | 8/2011 | Lee | G10L 25/78 704/233 |
| 2011/0307253 A1* | 12/2011 | Lloyd | G10L 15/20 704/233 |
| 2012/0059715 A1* | 3/2012 | Timmins | G06Q 30/0251 705/14.49 |
| 2012/0109652 A1 | 5/2012 | Levit et al. | |
| 2012/0215536 A1* | 8/2012 | Sehlstedt | G10L 25/78 704/246 |
| 2012/0215539 A1* | 8/2012 | Juneja | G10L 15/30 704/254 |
| 2012/0239392 A1* | 9/2012 | Mauger | G10L 21/0216 704/226 |
| 2012/0239401 A1 | 9/2012 | Arakawa | |
| 2012/0303369 A1* | 11/2012 | Brush | G10L 17/02 704/246 |
| 2013/0024192 A1 | 1/2013 | Nomura et al. | |
| 2013/0135496 A1* | 5/2013 | Nomura | G06K 9/6217 348/231.6 |
| 2013/0144618 A1* | 6/2013 | Sun | G10L 15/065 704/233 |
| 2013/0173264 A1* | 7/2013 | Kiss | G10L 25/63 704/231 |
| 2013/0211832 A1* | 8/2013 | Talwar | G10L 15/20 704/233 |
| 2014/0005988 A1* | 1/2014 | Brockway | H03H 17/0248 703/2 |

FOREIGN PATENT DOCUMENTS

| | | |
|---|---|---|
| CN | 101051461 A | 10/2007 |
| CN | 101197130 A | 6/2008 |
| CN | 101593522 A | 12/2009 |
| CN | 102693724 A | 9/2012 |
| CN | 103065631 A | 4/2013 |
| CN | 103578468 A | 2/2014 |
| JP | 2001075595 A | 3/2001 |
| JP | 2003177781 A | 6/2003 |
| JP | 2003202887 A | 7/2003 |
| JP | 2003241788 A | 8/2003 |
| JP | 2008009153 A | 1/2008 |
| JP | 2010282239 A | 12/2010 |
| WO | WO 2008074076 A1 | 6/2008 |
| WO | WO 2010128560 A1 | 11/2010 |
| WO | WO 2011070972 A1 | 6/2011 |
| WO | WO 2011122522 A1 | 10/2011 |

OTHER PUBLICATIONS

Xu et al., "Noise Condition-Dependent Training Based on Noise Classification and SNR Estimation," IEEE Transactions on Audio, Speech, and Language Processing, vol. 15, No. 8, pp. 2431-2443, IEEE, New York, New York (Nov. 2007).

Richiardi et al., "Confidence and Reliability Measures in Speaker Verification," Journal of the Franklin Institute, No. 343, pp. 574-595, Elsevier (Jul. 2006).

Kryszczuk et al., "Error Handling in Multimodal Biometric Systems Using Reliability Measures," 13th European Signal Processing Conference (Sep. 2005).

Chung, "Optimal SNR Model Selection in Multiple-Model Based Speech Recognition System," Applied Mathematics & Information Sciences, vol. 6, No. 2S, pp. 347S-353S, Natural Sciences Publishing Cor. (Jan. 2012).

"Signal-to-noise ratio," Wikipedia, https://en.wikipedia.org/wiki/Signal-to-noise ratio (Dec. 14, 2015).

* cited by examiner

VOICE IDENTIFICATION METHOD AND APPARATUS

CROSS-REFERENCE TO RELATED APPLICATION

This application claims priority to Chinese Patent Application No. 201310027326.9, filed on Jan. 24, 2013, which is hereby incorporated by reference in its entirety.

TECHNICAL FIELD

Embodiments of the present invention relate to the field of voice processing technologies, and in particular, to a voice identification method and apparatus.

BACKGROUND

A user generally performs voice identification by using voice assistant software on a terminal device such as a mobile phone. A process of performing voice identification by using software such as a voice assistant is that the user starts the voice assistant software to obtain voice data; the voice data is sent to a noise reduction module for noise reduction processing; the voice data after the noise reduction processing is sent to a voice identification engine; the voice identification engine returns an identification result to the voice assistant; and in order to reduce mis-determination, the voice assistant determines correctness of the identification result according to a confidence threshold, and then displays the identification result.

Currently, a use effect of software such as a voice assistant is generally better in a quiet environment such as an office. However, the use effect is poor in a noise environment (for example, an on-board environment). In the industry, a voice identification rate is generally improved by using a software noise reduction method, but an improvement effect is not distinct and sometimes the identification rate is even lowered.

SUMMARY

The technical solutions provide a voice identification method and apparatus, which are used to improve a voice identification rate and at the same time improve user experience.

In a first aspect, a voice identification method is provided and includes: obtaining voice data; obtaining a first confidence value according to the voice data; obtaining a noise scenario according to the voice data; obtaining a second confidence value corresponding to the noise scenario according to the first confidence value; and if the second confidence value is greater than or equal to a pre-stored confidence threshold, processing the voice data.

With reference to the first aspect, in a first possible implementation manner of the first aspect, the noise scenario specifically includes: a noise type and a noise magnitude.

With reference to the first possible implementation manner of the first aspect, in a second possible implementation manner of the first aspect, the noise scenario includes the noise type, and the obtaining a noise scenario according to the voice data specifically includes: obtaining, according to the voice data, a frequency cepstrum coefficient of a noise in the voice data; and obtaining, according to the frequency cepstrum coefficient of the noise and a pre-established noise type model, the noise type of the voice data.

With reference to the second possible implementation manner of the first aspect, in a third possible implementation manner of the first aspect, a method for establishing a noise type model specifically includes: obtaining noise data; obtaining a frequency cepstrum coefficient of the noise data according to the noise data; and processing the frequency cepstrum coefficient according to an EM algorithm, and establishing the noise type model.

With reference to the third possible implementation manner of the first aspect or the second possible implementation manner of the first aspect, in a fourth possible implementation manner of the first aspect, the noise type model is a Gaussian mixture model.

With reference to the first possible implementation manner of the first aspect, in a fifth possible implementation manner of the first aspect, the noise scenario includes a noise magnitude, and the obtaining a noise scenario according to the voice data specifically includes: obtaining, according to the voice data, a feature parameter of the voice data; performing voice activity detection according to the feature parameter; and obtaining the noise magnitude according to a result of the voice activity detection.

With reference to the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the noise magnitude specifically includes: a signal-to-noise ratio; and a noise energy level.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect, in a seventh possible implementation manner of the first aspect, the obtaining a second confidence value corresponding to the noise scenario according to the first confidence value specifically includes: obtaining, according to correspondence between the noise scenario and pre-stored empirical data of an adjusting value of a confidence value, an adjusting value of a confidence value corresponding to the noise scenario; and adjusting the first confidence value according to the adjusting value of the confidence value, and obtaining the second confidence value, where the adjusting includes: increasing, decreasing, and remaining unchanged.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect, in an eighth possible implementation manner of the first aspect, a user is prompted if the second confidence value is smaller than the confidence threshold.

In a second aspect, a voice identification apparatus is provided and includes: an obtaining unit, configured to obtain voice data; a first confidence value unit, configured to receive the voice data obtained by the obtaining unit, and obtain a first confidence value according to the voice data; a noise scenario unit, configured to receive the voice data obtained by the obtaining unit, and obtain a noise scenario according to the voice data; a second confidence value unit, configured to receive the noise scenario of the noise scenario unit and the first confidence value of the first confidence value unit, and obtain a second confidence value corresponding to the noise scenario according to the first confidence value; and a processing unit, configured to receive the second confidence value obtained by the second confidence value unit, and if the second confidence value is greater than or equal to a pre-stored confidence threshold, process the voice data.

With reference to the second aspect, in a first possible implementation manner of the second aspect, the apparatus further includes: a model establishing unit, configured to obtain noise data, obtain a frequency cepstrum coefficient of the noise data according to the noise data, process the frequency cepstrum coefficient according to an EM algorithm, and establish a noise type model.

With reference to the first possible implementation manner of the second aspect, in a second possible implementation manner of the second aspect, the noise scenario unit specifically includes: a noise type unit, configured to obtain, according to the voice data of the obtaining unit, a frequency cepstrum coefficient of a noise in the voice data, and obtain, according to the frequency cepstrum coefficient of the noise and the noise type model of the model establishing unit, a noise type of the voice data.

With reference to the second aspect or the first possible implementation manner of the second aspect or the second possible implementation manner of the second aspect, in a third possible implementation manner of the second aspect, the noise scenario unit further includes: a noise magnitude unit, configured to obtain, according to the voice data of the obtaining unit, a feature parameter of the voice data, perform voice activity detection according to the feature parameter, and obtain a noise magnitude according to a result of the voice activity detection.

With reference to the second aspect or the first possible implementation manner of the second aspect or the second possible implementation manner of the second aspect or the third possible implementation manner of the second aspect, in a fourth possible implementation manner of the second aspect, the apparatus further includes: a storage unit, configured to store a confidence threshold and empirical data of an adjusting value of an confidence value.

With reference to the fourth possible implementation manner of the second aspect, in a fifth possible implementation manner of the second aspect, the second confidence value unit is specifically configured to obtain, according to correspondence between the noise scenario and the empirical data, an adjusting value of a confidence value corresponding to the noise scenario; and adjust the first confidence value according to the adjusting value of the confidence value, and obtain the second confidence value, where the adjusting includes: increasing, decreasing, and remaining unchanged.

In a third aspect, a mobile terminal is provided and includes a processor and a microphone, where the microphone is configured to obtain voice data; and the processor is configured to obtain a first confidence value according to the voice data, obtain a noise scenario according to the voice data, obtain a second confidence value corresponding to the noise scenario according to the first confidence value, and if the second confidence value is greater than or equal to a pre-stored confidence threshold, process the voice data.

With reference to the third aspect, in a first possible implementation manner of the third aspect, the mobile terminal further includes: a memory, configured to store empirical data of an adjusting value of an confidence value and a confidence threshold.

With reference to the first possible implementation manner of the third aspect, in a second possible implementation manner of the third aspect, the processor is specifically configured to obtain the first confidence value according to the voice data; obtain the noise scenario according to the voice data; obtain, according to correspondence between the noise scenario and the empirical data, an adjusting value of a confidence value corresponding to the noise scenario; adjust the first confidence value according to the adjusting value of the confidence value, and obtain the second confidence value; and if the second confidence value is greater than or equal to the confidence threshold, process the voice data.

The technical solutions of the present invention provide a voice identification method and apparatus. In the method and apparatus, the noise scenario is obtained, and the second confidence value is obtained according to the pre-stored empirical data of the adjusting value of the confidence value and the noise scenario. The method and apparatus that flexibly adjust the confidence value according to the noise scenario greatly improve a voice identification rate under a noise environment.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the embodiments of the present invention.

Terms used in embodiments of the present invention are merely intended to describe specific embodiments, but not to limit the present invention. "A" and "the" in a singular form used in the embodiments of the present invention and the claims also aim to include a plural form, except that the context clearly represents other meanings. It should also be understood that the term "and/or" used in the specification refers to any or all possible combinations of one or more associated listed items. It should be further understood that the term "include" adopted in the specification specifies existence of features, integers, steps, operations, elements and/or components, but does not exclude existence or addition of other features, integers, steps, operations, components, elements, and their combinations.

In the embodiments of the present invention, the apparatus includes but is not limited to a device, such as a mobile phone, a personal digital assistant (Personal Digital Assistant, PDA), a tablet computer, a portable device (for example, a portable computer), an on-board device, and an ATM machine (Automatic Teller Machine, automatic teller machine), to which it is not limited in the embodiments of the present invention.

Embodiment 1

Figure 1:
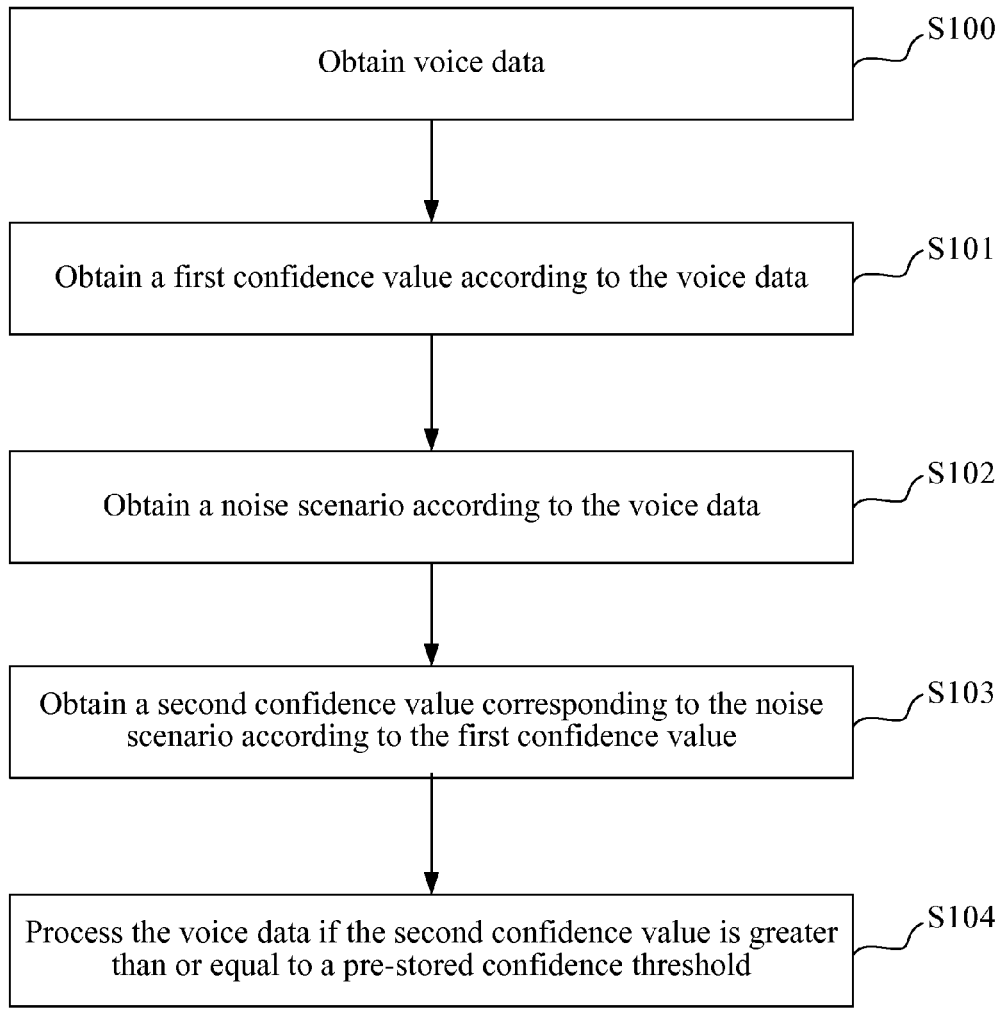
FIG. 1 is a flowchart of a voice identification method according to Embodiment 1 of the present invention.

FIG. 1 is a flowchart of a voice identification method according to Embodiment 1 of the present invention.

As shown in FIG. 1, Embodiment 1 of the present invention provides a voice identification method, which may specifically include:

S100: Obtain voice data.

A user starts voice identification software, such as a voice assistant, on an apparatus to obtain, through a microphone, voice data that is input by the user. It should be understood that the voice data may also not be input by the user, may also be input by a machine, and may include any data including information.

S101: Obtain a first confidence value according to the voice data. The first confidence value refers to a degree of belief on authenticity of a specific thesis by a specific individual, and in the embodiment of the present invention, is the degree of belief on authenticity of an identification result of the voice data by the apparatus and so on. That is, the first confidence value is a numerical value used to indicate a credibility degree of a voice identification result. For example, the voice data input by the user is "Give Zhang San calling", during a voice data identification process, a returned first confidence value includes: a sentence confidence N1 (overall confidence of "Give Zhang San calling"), a preposed command word confidence N2 ("give" is a preposed command word, that is, the first confidence value of "give" is N2), a person name confidence N3 ("Zhang San" is a name, that is, the confidence value of "Zhang San" is N3), and a postposed command word confidence N4 ("calling" is a postposed command word, that is, the confidence of "calling" is N4). Usually, the sentence confidence N1 is obtained by integrating N2, N3, and N4. In a certain experiment, it is obtained, by testing, that the first confidence value of the voice data "Give Zhang San calling" input by the user is N1=62, N2=50, N3=48, and N4=80, respectively.

It should be understood that although terms, such as the first and the second, may be adopted to describe various confidence values in the embodiment of the present invention, the confidence values shall not be limited to the terms. The terms are only used to differentiate the confidence values from each other. For example, without departing from the scope of the embodiment of the present invention, the first confidence value may also be called the second confidence value, and similarly, the second confidence value may also be called the first confidence value. The first confidence value and the second confidence value are both the confidence values.

S102: Obtain a noise scenario according to the voice data.

According to the voice data input by the user, the noise scenario is obtained. The noise scenario is a noise state when the user inputs the voice data. That is, it may be understood as whether the user inputs the voice data in a noise environment on a road, in a noise environment in an office, or in an on-board noise environment, and whether noise in a corresponding environment where the user is located is large or small.

It should be understood that step S102 may be before step S101, step S102 may also be after step S101, or step S102 and step S101 may be executed at the same time, to which it is not limited in the embodiment of the present invention.

S103: Obtain a second confidence value corresponding to the noise scenario according to the first confidence value.

The second confidence value is obtained according to the obtained first confidence value. The second confidence value is not directly obtained according to the voice data input by the user, but is obtained according to the first confidence value. After the noise scenario of the voice data is obtained, the second confidence value corresponding to the noise scenario may be obtained according to the first confidence value.

S104: Process the voice data if the second confidence value is greater than or equal to a pre-stored confidence threshold.

The pre-stored confidence threshold is used as an index for evaluating whether the second confidence value is acceptable, if the second confidence value is greater than the confidence threshold, it is considered that an identification result is correct, and if the second confidence value is smaller than the confidence threshold, it is considered that the identification result is incorrect, and the result cannot be believed.

If the second confidence value is greater than or equal to the pre-stored confidence threshold, it is considered that the identification result of the voice data is correct, that is, to process corresponding voice data. For example, if the second confidence value N3 obtained in step S103 is 48 and the pre-stored confidence threshold in step S104 is 40, then the second confidence value is greater than the confidence threshold and the identification result of the voice data is correct. Further, an example is given for description, when the voice data is voice data including a command word, such as "Give Zhang San calling", "Send Zhang San a short message", and "Open an application program", the voice identification belongs to command word identification, and then the apparatus executes a corresponding command and an operation such as making a call, sending a short message, and opening an application program. If the voice data identification belongs to text dictation identification, an identification result text is displayed. That is, if the second confidence value is greater than or equal to the pre-stored confidence threshold, the voice data is processed.

The technical solution of the present invention provides a voice identification method. In the method, the noise scenario is obtained, and the second confidence value is obtained according to the pre-stored empirical data of the adjusting value of the confidence value and the noise scenario. The method that flexibly adjusts the confidence value according to the noise scenario greatly improves a voice identification rate under a noise environment.

Optionally

Figure 2:
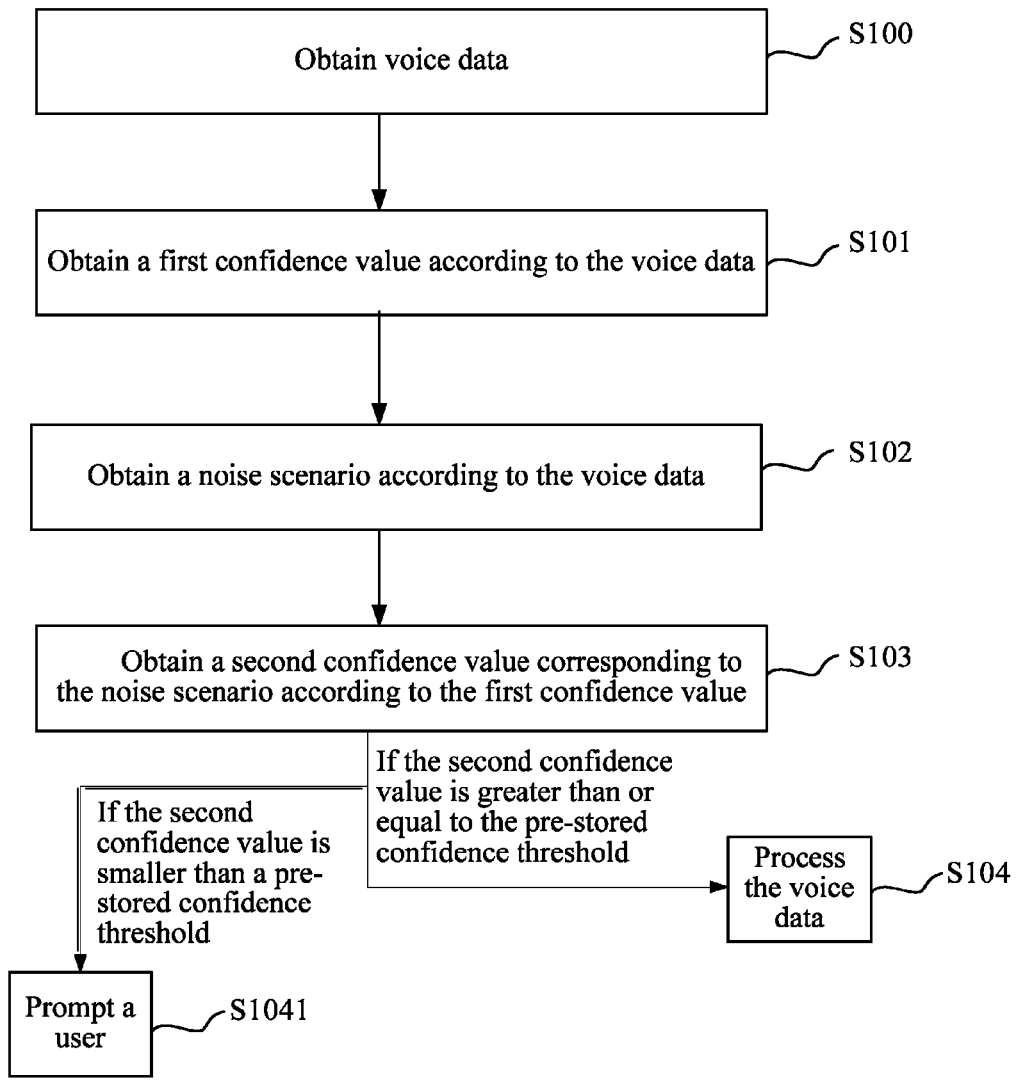
FIG. 2 is a flowchart of another implementation manner of a voice identification method according to Embodiment 1 of the present invention.

FIG. 2 is a flowchart of another implementation manner of a voice identification method according to Embodiment 1 of the present invention.

As shown in FIG. 2, the method further includes:

S1041: Prompt the user if the second confidence value is smaller than the confidence threshold.

If the second confidence value is smaller than the confidence threshold, it is considered that the identification result of the voice data is incorrect, and the user is prompted. For example, if the second confidence value N3 obtained in step S103 is 48 and the pre-stored confidence threshold in step S104 is 50, then the second confidence value is smaller than the confidence threshold and the identification result of the voice data is incorrect. Further, an example is given for description, when the voice data is "Give Zhang San calling", the apparatus determines that the identification result of the voice data is incorrect, and the system prompts the user to speak again and/or notifies the user of a fault. That is, if the second confidence value is smaller than the confidence threshold, the user is prompted to re-input or correct the fault.

The technical solution of the present invention provides a voice identification method. In the method, the noise scenario is obtained, and the second confidence value is obtained according to the pre-stored empirical data of the adjusting value of the confidence value and the noise scenario. The method that flexibly adjusts the confidence value according to the noise scenario greatly improves a voice identification rate under a noise environment.

Embodiment 2

Figure 3:
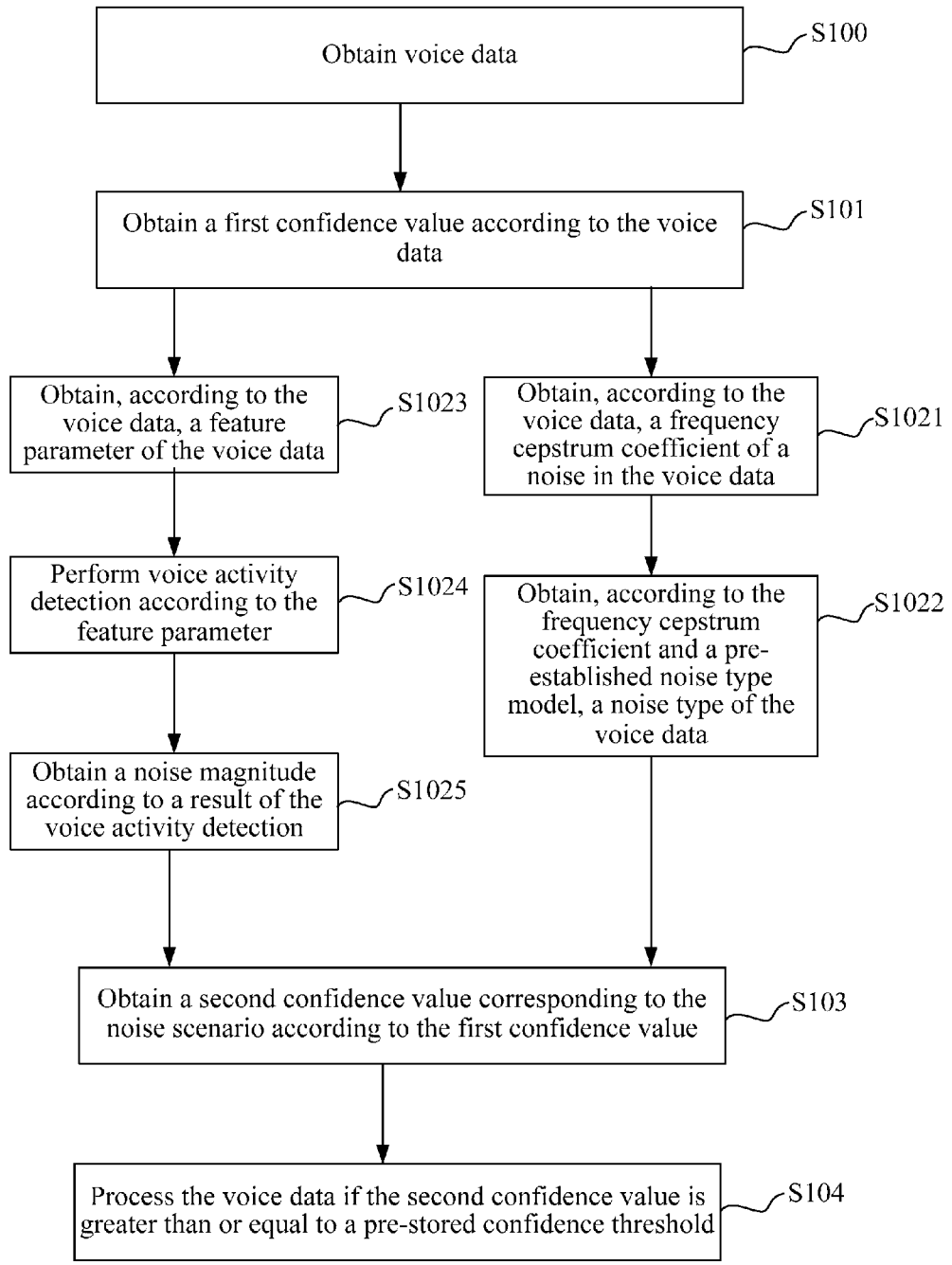
FIG. 3 is a flowchart of another implementation manner of a voice identification method according to Embodiment 2 of the present invention.

FIG. 3 is a flowchart of another implementation manner of a voice identification method according to Embodiment 2 of the present invention.

Embodiment 2 of the present invention is described on a basis of Embodiment 1 of the present invention. As shown in FIG. 3, in step S102 of Embodiment 1, the noise scenario specifically includes: a noise type; and a noise magnitude.

The noise type refers to a noise environment where a user is located when inputting voice data. That is, it may be understood as whether the user is in a noise environment on a road, in a noise environment in an office, or in an on-board noise environment.

The noise magnitude represents a magnitude of noise in the noise environment where the user is located when inputting the voice data. Optionally, the noise magnitude includes: a signal-to-noise ratio and a noise energy level. The signal-to-noise ratio is a ratio of voice data power to noise data power, and is usually represented by decibels. Generally, a higher signal-to-noise ratio indicates a smaller noise data power, and a lower signal-to-noise ratio indicates a bigger noise data power. The noise energy level is used to reflect a magnitude of energy of noise data in the voice data of the user. The signal-to-noise ratio and the noise energy level are combined to indicate the noise magnitude.

The noise scenario includes the noise type, in step S102 of Embodiment 1, the obtaining a noise scenario according to the voice data specifically includes:

S1021: Obtain, according to the voice data, a frequency cepstrum coefficient of a noise in the voice data.

According to the voice data input by the user, a voice data frame and a noise data frame are determined through voice activity detection (Voice activity detection, VAD), and after the noise data frame is obtained, a frequency cepstrum coefficient of the noise data frame is obtained. Mel (mel) is a unit of subjective pitch, and Hz (hertz) is a unit of objective pitch. A Mel frequency is proposed based on an auditory feature of a human ear, and has non-linear correspondence with an Hz frequency. A frequency cepstrum coefficient (Mel Frequency Cepstrum Coefficient, MFCC) is a cepstrum coefficient on the Mel frequency, has good identification performance, and is widely applied to a field such as voice identification, voiceprint recognition, and language identification.

S1022: Obtain, according to the frequency cepstrum coefficient of the noise and a pre-established noise type model, the noise type of the voice data.

The frequency cepstrum coefficient is respectively substituted into each pre-established noise type model for calculation, and if a calculation result value of a certain noise type model is a maximum, it is considered that the user is located in an environment of the noise type when inputting the voice data, that is, the noise type of the voice data is obtained.

The pre-established noise type model in step S1022 is a Gaussian mixture model.

Gaussian density function estimation is a parameterized model, which includes two types: namely, a single Gaussian model (Single GaussianModel, SGM) and a Gaussian mixture model (Gaussian mixture model, GMM). A Gaussian model is a valid clustering model, which may consider, according to different Gaussian probability density function parameters, each established Gaussian model as a type. When a sample x is input, a value is calculated by using the Gaussian probability density function, and then it is determined, through a threshold, whether the sample belongs to an established Gaussian model. The GMM has multiple models, of which dividing is finer, is applicable to dividing of a complex object, and is widely applied to establishment of a complex object model. For example, in voice identification, the GMM is used for classification and model establishment of different noise types.

In the embodiment of the present invention, a process of establishing the GMM of a certain noise type may be: inputting multiple groups of noise data of a same type, repeatedly training the GMM model according to the noise data, and finally obtaining the GMM of the noise type.

The Gaussian mixture model may be expressed by the following formula:

$$p(x) = \sum_{i=1}^{N} \alpha_i N(x; \mu_i, \Sigma_i), \text{ where } \sum_{i=1}^{N} \alpha_i = 1$$

The Gaussian model $N(x; \mu, \Sigma)$ may be expressed by the following formula:

$$N(x; \mu, \Sigma) = \frac{1}{\sqrt{2\pi|\Sigma|}} \exp\left[-\frac{1}{2}(x-\mu)^T \Sigma^{-1}(x-\mu)\right]$$

where, N is a degree of mixing of the GMM model, that is, being combined by N Gaussian models, $\alpha_i$ is a weight of an $i^{th}$ Gaussian model, $\mu$ is an average value, and $\Sigma$ is a covariance matrix. In theory, any shape in space may use a GMM model for model establishing. Because an output of the Gaussian model is a decimal between 0 and 1, for ease of calculation, generally, a natural logarithm (ln) is obtained from a result, so as to become a floating-point number smaller than 0.

A method for establishing the pre-established noise type model in step S1022 includes:

obtaining noise data. Obtain multiple groups of same-type noise, for example, noise data such as on-board noise, street noise, and office noise, which are used to establish the GMM of the type of noise data, that is, a noise type model of the type of noise data. It should be understood that in the present invention, another type of noise data may also be obtained, and a corresponding noise type model is established for each type of noise data, to which it is not limited in the embodiment of the present invention;

obtaining, according to the noise data, the frequency cepstrum coefficient of the noise data. Extract the frequency cepstrum coefficient of the noise from the noise data. Mel (mel) is a unit of subjective pitch, and Hz (hertz) is a unit of objective pitch. A Mel frequency is proposed based on an auditory feature of a human ear, and has non-linear correspondence with an Hz frequency. A frequency cepstrum coefficient (Mel Frequency Cepstrum Coefficient, MFCC) is a cepstrum coefficient on the Mel frequency, has good identification performance, and is widely applied to a field such as voice identification, voiceprint recognition, and language identification; and processing the frequency cepstrum coefficient according to an EM algorithm, and establishing a noise type model. In statistics, the EM algorithm (Expectation-maximization algorithm, expectation-maximization algorithm) is used to search for a maximum likelihood estimation of a parameter in a probability model depending on an unobservable latent variable. In statistical calculation, the expectation-maximization (EM) algorithm searches for the maximum likelihood estimation or a maximum posteriori estimation of the parameter, where the GMM depends on the unobservable latent variable (Latent Variable).

In the EM algorithm, calculation is performed alternately in two steps: A first step is to calculate expectation (E). Estimate an expectation value of an unknown parameter, and give a current parameter estimation. A second step is to perform maximization (M). Re-estimate a distribution parameter, so as to maximize likelihood of data, and give an expected estimation of an unknown variable. As a whole, a procedure of the EM algorithm is as follows: 1. Initialize the distribution parameter; 2. Repeat until convergence. Simply speaking, the EM algorithm is that, assuming that two parameters, A and B, are known by estimation, and the two are both unknown in a starting state, if information of A is known, information of B may be obtained, and reversely, if information of B is known, information of A may be obtained. It may be considered to first endow A with a certain initial value, so as to obtain an estimated value of B, and then from a current value of B, re-estimate a value of A. The process continues until convergence. The EM algorithm performs the maximum likelihood estimation on the parameter from an incomplete data set, and is a quite simple and practical learning algorithm. By alternately using the two steps of E and M, the EM algorithm gradually modifies the parameter of the model, so that a likelihood probability of the parameter and a training sample is gradually increased, and finally ends at a maximum point. Intuitively understanding, the EM algorithm may also be considered as a successive approximation algorithm: The parameter of the model is not known in advance, a set of parameters may be randomly selected or a certain initial parameter may be roughly given in advance, a most possible state corresponding to a group of parameters is determined, a probability of a possible result of each training sample is calculated, and a parameter is corrected through a sample in a current state to re-estimate the parameter, and a state of the model is re-determined under the new parameter. In this way, through a plurality of iteration, circulation is performed until a certain convergence condition is satisfied, so as to make the parameter of the model gradually approximate to a real parameter.

The obtained frequency cepstrum coefficient is substituted into the EM algorithm for training, and through a training process, parameters such as N, $\alpha_i$, $\mu$, and $\Sigma$ in the Gaussian mixture model are obtained, and according to the parameters and $p(x)=\Sigma_{i=1}^{N}\alpha_i N(x; \mu_i, \Sigma_i)$, where $\Sigma_{i=1}^{N}\alpha_i=1$, the Gaussian mixture model is established, that is, the noise type model corresponding to the noise type is established. Meanwhile, x is a frequency cepstrum coefficient.

For example, in step S102 in Embodiment 1, the obtaining a noise scenario according to the voice data is specifically as follows:

Obtain the frequency cepstrum coefficient of the noise frame of the voice data according to the voice data, where the frequency cepstrum coefficient is x in the Gaussian mixture model $p(x)=\Sigma_{i=1}^{N}\alpha_i N(x; \mu_i, \Sigma_i)$. It is assumed that there are two noise type models, one is a noise type model of on-board noise obtained through on-board noise training, and the other is a noise type model of non-on-board noise obtained through non-on-board type noise (which may include office noise, street noise, supermarket noise, and so on) training Assume that the voice data input by the user has 10 noise frames, respectively substitute the frequency cepstrum coefficient of each noise frame, that is, x, into two noise type models $p(x)=\Sigma_{i=1}^{N}\alpha_i N(x; \mu_i, \Sigma_i)$ (where parameters such as N, $\alpha_i$, $\mu$, and $\Sigma$ are known) to obtain a calculation result, obtain a logarithm from the calculation result, and then perform cumulative average. A final result is shown as table 1:

TABLE 1

| Number of noise frames | 1 | 2 | 3 | 4 | 5 | 6 | 7 | 8 | 8 | 10 | Cumulative average |
|---|---|---|---|---|---|---|---|---|---|---|---|
| Noise type model of non-on-board noise | −46.8 | −46.6 | −45.3 | −43.8 | −47.8 | −50.7 | −46.5 | −47.7 | −46.7 | −45.7 | −46.8 |
| Noise type model of on-board noise | −43.0 | −41.9 | −41.3 | −39.7 | −42.1 | −47.7 | −41.5 | −39.6 | −43.6 | −38.7 | −41.9 |

The final result displays that the calculation result value of the noise type model of the on-board noise is greater than the calculation result value of the noise type model of the non-on-board noise (that is, −41.9>−46.8), so that the noise type of current voice data is on-board noise.

The technical solution of the present invention provides a method for improving a voice identification rate under a noise environment. In the method, the noise scenario is obtained, and the second confidence value is obtained according to the pre-stored empirical data of the adjusting value of the confidence value and the noise scenario. The method that flexibly adjusts the confidence value according to the noise scenario greatly improves a voice identification rate under a noise environment.

Optionally

As shown in FIG. 3, the noise scenario includes a noise magnitude, in step S102 of Embodiment 1, the obtaining a noise scenario according to the voice data specifically includes:

S1023: Obtain, according to the voice data, a feature parameter of the voice data.

The feature parameter of the voice data is extracted according to the voice data, where the feature parameter includes: sub-band energy, a fundamental tone, and a cyclic factor.

For the sub-band energy, according to different useful components in different bands of the voice data, a band of 0-8K is divided into N sub-bands, and energy of each frame of voice of each sub-band is respectively calculated. A formula for calculating the sub-band energy is:

$$ener = \frac{1}{L}\sum_{i=0}^{L-1}(x[i]^\wedge 2)$$

where, L is a frame length, and a frame of voice data is x[0]x[1] to x[L−1].

The fundamental tone and the cyclic factor reflect a periodical component in the voice. In the voice, the periodic component is very poor in a mute segment and a voiceless segment, and the periodicity is very good in a voiced segment. Based on this point, voice frame detection may be performed.

S1024: Perform voice activity detection according to the feature parameter.

According to the voice data input by the user, the voice data frame and the noise data frame are determined through the voice activity detection (Voice activity detection, VAD), and the fundamental tone, the cyclic factor, and the sub-band energy are combined, so as to perform determination on a voice frame and a mute frame.

In VAD determination, the voice frame and the noise frame is determined mainly based on the following two elements:

1) the energy of the voice frame is higher than the energy of the noise frame; and 2) a frame with a stronger periodicity is generally the voice frame.

S1025: Obtain the noise magnitude according to a result of the voice activity detection.

According to a VAD determination result, respectively calculate an average energy of the voice frame and the noise frame to obtain a voice energy level (speechLev) and a noise energy level (noiseLev), and then obtain, by calculating, a signal-to-noise ratio (SNR). The formula is:

$$noiseLev = 10*\log10\left(1 + \frac{1}{Ln}\sum_{i=1}^{Ln} ener[N_i]\right)$$

$$speechLev = 10*\log10\left(1 + \frac{1}{Ls}\sum_{i=1}^{Ls} ener[S_j]\right)$$

$$SNR = speechLev - noiseLev$$

where, Ln and Ls respectively represent the total number of noise frames and the total number of voice frames, ener[Ni] represents the energy of the $i^{th}$ noise frame, and ener[Sj] represents the energy of the $j^{th}$ voice frame.

The technical solution of the present invention provides a method for improving a voice identification rate under a noise environment. In the method, the noise scenario is obtained, and the second confidence value is obtained according to the pre-stored empirical data of the adjusting value of the confidence value and the noise scenario. The method that flexibly adjusts the confidence value according to the noise scenario greatly improves a voice identification rate under a noise environment.

Embodiment 3

Figure 4:
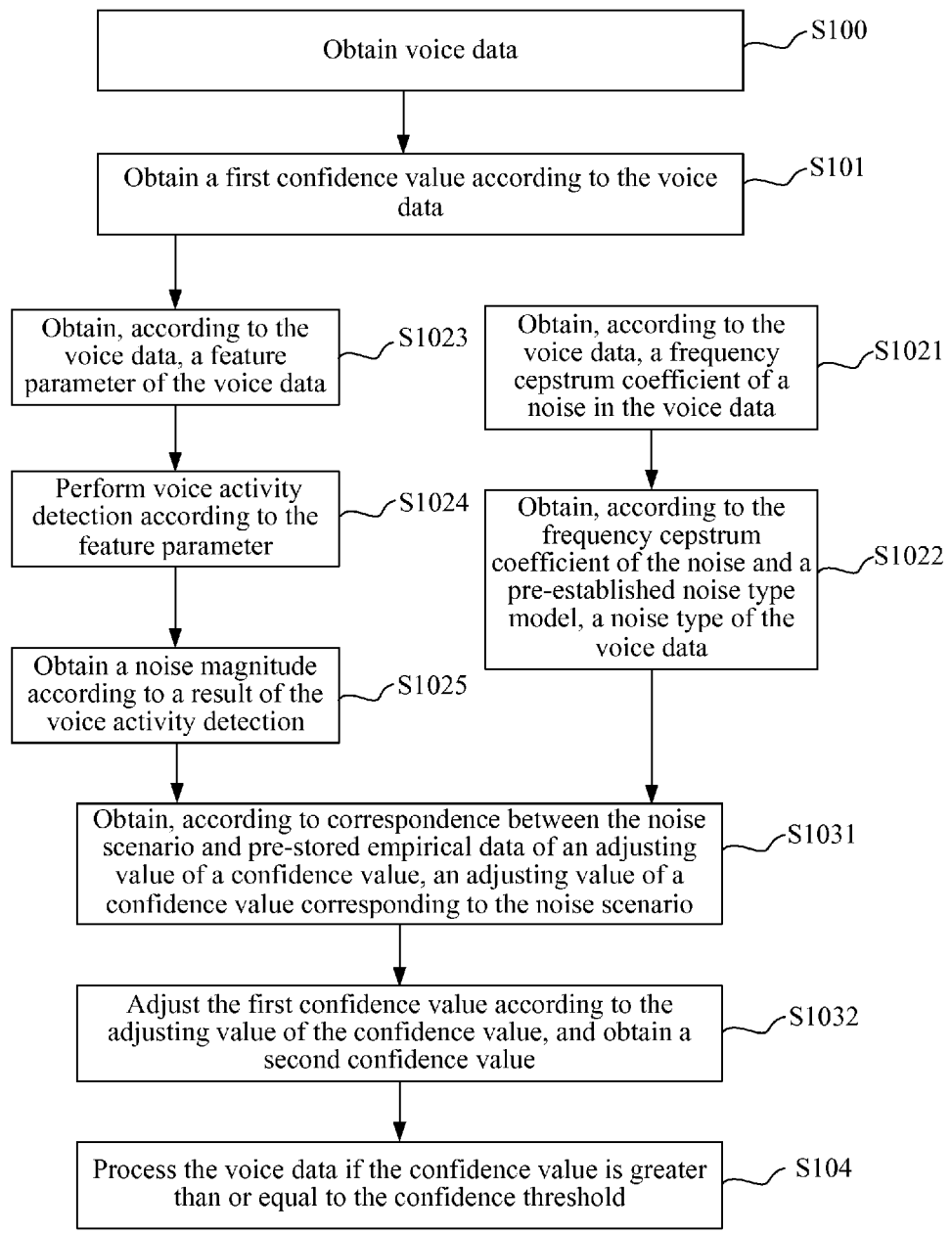
FIG. 4 is a flowchart of another implementation manner of a voice identification method according to Embodiment 3 of the present invention.

FIG. 4 is a flowchart of another implementation manner of a voice identification method according to Embodiment 3 of the present invention.

This embodiment is described on a basis of Embodiment 1, as shown in FIG. 4, the method of step S103 of Embodiment 1 specifically includes:

S1031: Obtain, according to correspondence between a noise scenario and pre-stored empirical data of an adjusting value of a confidence value, an adjusting value of a confidence value corresponding to the noise scenario.

The adjusting value of the confidence value corresponding to the noise scenario is obtained according to a noise type in the noise scenario, a noise magnitude, and the empirical data of the adjusting value of the confidence value obtained through great amount of emulating measurement. The noise type indicates a type of environment where a user is located when voice identification is performed, and the noise magnitude indicates the noise magnitude of the type of environment where the user is located. In combination with the noise type, when noise is larger, the confidence value is correspondingly increased; and in combination with the noise type, when noise is smaller, the confidence value is correspondingly decreased. Specific empirical data of the adjusting value of the confidence value is obtained by statistics collecting in emulation measurement.

For Example

The noise type is an on-board environment. When the noise is larger (that is, a noise level is smaller than −30 dB, and a signal-to-noise ratio is smaller than 10 dB), it is obtained by statistics collecting in emulation measurement that in the noise scenario, the adjusting value of the confidence value is +15-+5. Therefore, in the noise scenario, the adjusting value of the confidence value is obtained by increasing a certain value between 15 and 5.

The noise type is an on-board environment. When the noise is smaller (a noise level is greater than −30 dB and smaller than −40 dB, and a signal-to-noise ratio is greater than 10 dB and smaller than 20 dB), it is obtained by statistics collecting in emulation measurement that, in the noise scenario, the adjusting value of the confidence value is +10-+3. Therefore, in the noise scenario, the adjusting value of the confidence value is obtained by adjusting a certain value between 10 and 3 to be greater.

The noise type is an office environment, when the noise is smaller (the noise level is greater than −40 dB, and the signal-to-noise ratio is greater than 20 dB), it is obtained by statistics collecting in emulation measurement that in the noise scenario, the adjusting value of the confidence value is +5-0. Therefore, in the noise scenario, the adjusting value of the confidence value is obtained by adjusting a certain value between 5 and 0 to be greater.

S1032: Adjust the first confidence value according to the adjusting value of the confidence value, and obtain the second confidence value, where the adjusting includes: increasing, decreasing, and remaining unchanged.

The first confidence value obtained in step S101 is adjusted according to the adjusting value of the confidence value. When the first confidence value is adjusted according to the adjusting value of the confidence value, and the second confidence value is obtained, the first confidence value may be adjusted to be greater or smaller or remain unchanged.

The technical solution of the present invention provides a method for improving a voice identification rate under a noise environment. In the method, the noise scenario is obtained, and the second confidence value is obtained according to the pre-stored empirical data of the adjusting value of the confidence value and the noise scenario. The method that flexibly adjusts the confidence value according to the noise scenario greatly improves a voice identification rate under a noise environment.

Embodiment 4

Figure 5:
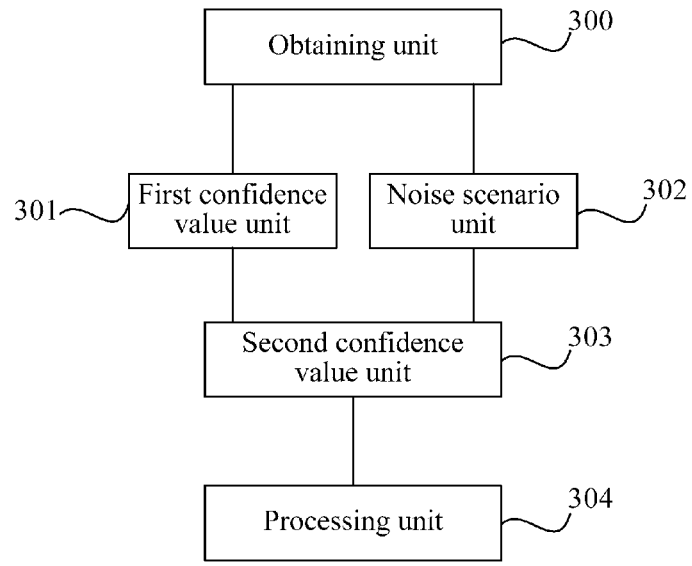
FIG. 5 is a schematic structural diagram of a voice identification apparatus according to Embodiment 4 of the present invention.

FIG. 5 is a schematic structural diagram of a voice identification apparatus according to Embodiment 4 of the present invention.

As shown in FIG. 5, the apparatus includes:

an obtaining unit 300, configured to obtain voice data;

a first confidence value unit 301, configured to receive the voice data obtained by the obtaining unit 300, and obtain a first confidence value according to the voice data;

a noise scenario unit 302, configured to receive the voice data obtained by the obtaining unit 300, and obtain a noise scenario according to the voice data;

a second confidence value unit 303, configured to receive the noise scenario of the noise scenario unit 302 and the first confidence value of the first confidence value unit 301, and obtain a second confidence value corresponding to the noise scenario according to the first confidence value; and a processing unit 304, configured to receive the second confidence value obtained by the second confidence value unit 303, and if the second confidence value is greater than or equal to a pre-stored confidence threshold, process the voice data.

The obtaining unit 300 obtains the voice data; the first confidence value unit 301 receives the voice data obtained by the obtaining unit 300, and obtains the first confidence value according to the voice data; the noise scenario unit 302 receives the voice data obtained by the obtaining unit 300, and obtains the noise scenario according to the voice data, where the noise scenario includes a noise type, and a noise magnitude; the second confidence value unit 303 receives the noise scenario of the noise scenario unit 302 and the first confidence value of the first confidence value unit 301, and obtain the second confidence value corresponding to the noise scenario according to the first confidence value; and the processing unit 304 receives the second confidence value obtained by the second confidence value unit 303, and if the second confidence value is greater than or equal to the pre-stored confidence threshold, process the voice data.

The obtaining unit 300, the first confidence value unit 301, the noise scenario unit 302, the second confidence value unit 303, and the processing unit 304 may be configured to execute the method described in steps S100, S101, S102, S103, and S104 in Embodiment 1. For specific description, reference is made to the description of the method in Embodiment 1, which is not repeatedly described herein.

The technical solution of the present invention provides a voice identification apparatus. In the apparatus, the noise scenario is obtained, and the second confidence value is obtained according to the pre-stored empirical data of the adjusting value of the confidence value and the noise scenario. The apparatus that flexibly adjusts the confidence value according to the noise scenario greatly improves a voice identification rate under a noise environment.

Optionally

Figure 6:
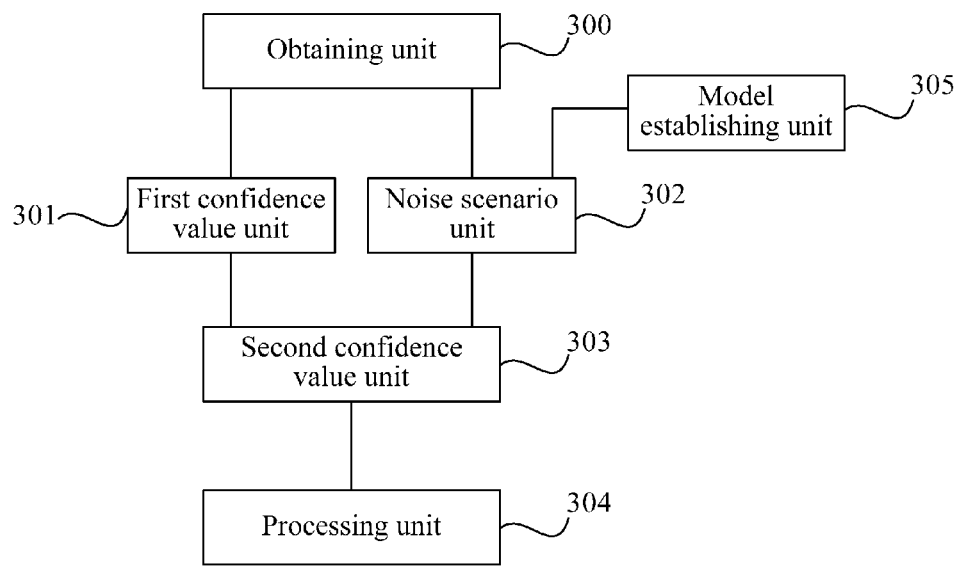
FIG. 6 is another possible schematic structural diagram of a voice identification apparatus according to Embodiment 4 of the present invention.

FIG. 6 is another possible schematic structural diagram of a voice identification apparatus according to Embodiment 4 of the present invention.

As shown in FIG. 6, the apparatus further includes:

a model establishing unit 305, configured to obtain noise data, obtain a frequency cepstrum coefficient of the noise data according to the noise data, process the frequency cepstrum coefficient according to an EM algorithm, and establish a noise type model.

The model establishing unit 305 may be configured to execute the method for pre-establishing the noise type model in step S1022 of Embodiment 2. For specific description, reference is made to the description of the method in Embodiment 2, which is not repeatedly described herein.

The technical solution of the present invention provides a voice identification apparatus. In the apparatus, the noise scenario is obtained, and the second confidence value is obtained according to the pre-stored empirical data of the adjusting value of the confidence value and the noise scenario. The apparatus that flexibly adjusts the confidence value according to the noise scenario greatly improves a voice identification rate under a noise environment.

Optionally

Figure 7:
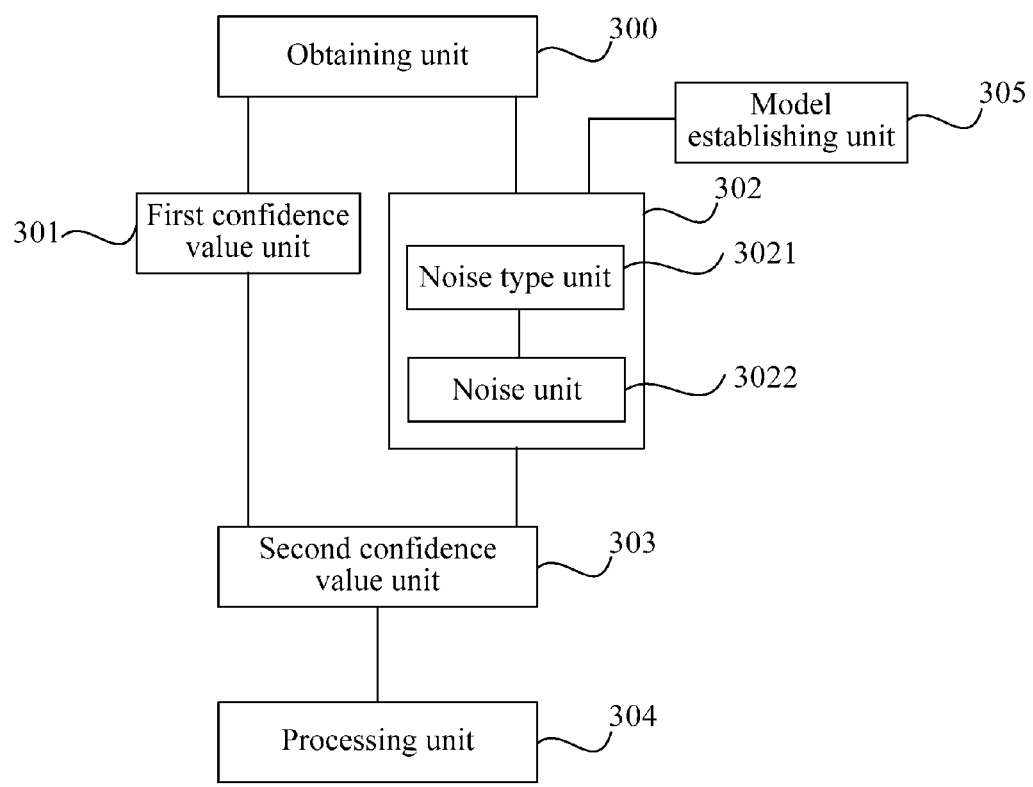
FIG. 7 is another possible schematic structural diagram of a voice identification apparatus according to Embodiment 4 of the present invention.

FIG. 7 is another possible schematic structural diagram of a voice identification apparatus according to Embodiment 4 of the present invention.

As shown in FIG. 7, the noise scenario unit specifically includes:

a noise type unit 3021, configured to obtain, according to the voice data of the obtaining unit, a frequency cepstrum coefficient of a noise in the voice data, and obtain, according to the frequency cepstrum coefficient of the noise and the noise type model of the model establishing unit, a noise type of the voice data, where, the noise type unit 3021 may be configured to execute the method described in steps S1021 and S1022 of Embodiment 2. For specific description, reference is made to the description of the method in Embodiment 2, which is not repeatedly described herein; and a noise magnitude unit 3022, configured to obtain, according to the voice data of the obtaining unit, a feature parameter of the voice data, perform voice activity detection according to the feature parameter, and obtain a noise magnitude according to a result of the voice activity detection, where the noise magnitude unit 3022 may be configured to execute the method described in steps S1023, S1024, and S1025 of Embodiment 2. For specific description, reference is made to the description of the method in Embodiment 2, which is not repeatedly described herein.

The technical solution of the present invention provides a voice identification apparatus. In the apparatus, the noise scenario is obtained, and the second confidence value is obtained according to the pre-stored empirical data of the adjusting value of the confidence value and the noise scenario. The apparatus that flexibly adjusts the confidence value according to the noise scenario greatly improves a voice identification rate under a noise environment.

Optionally

Figure 8:
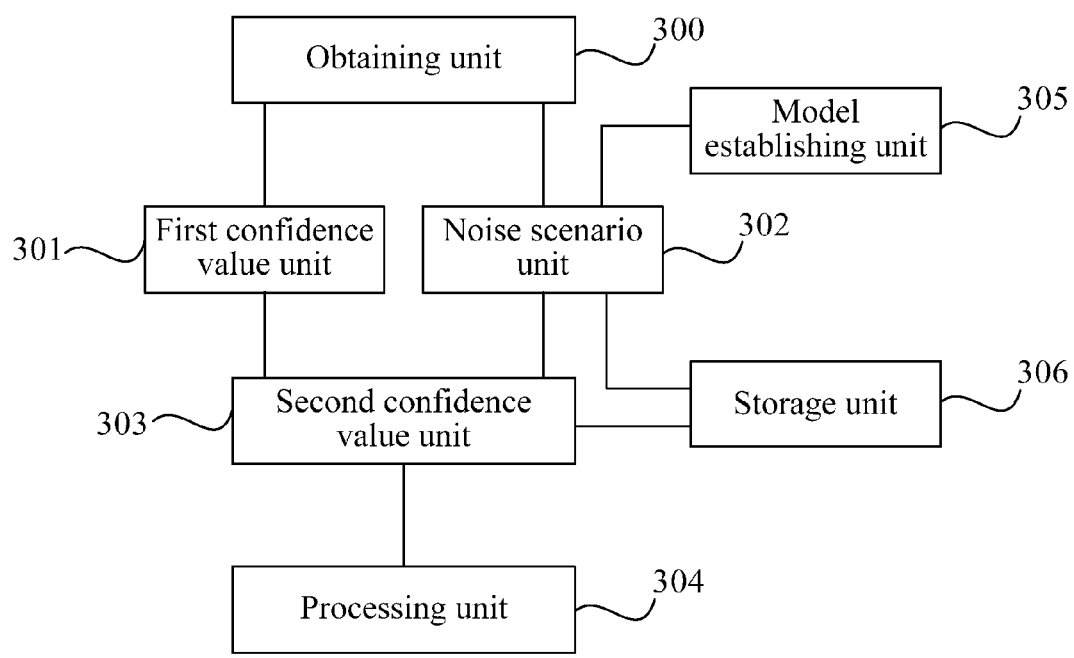
FIG. 8 is another possible schematic structural diagram of a voice identification apparatus according to Embodiment 4 of the present invention.

FIG. 8 is another possible schematic structural diagram of a voice identification apparatus according to Embodiment 4 of the present invention.

As shown in FIG. 8, the apparatus further includes:

a storage unit 306, configured to store a confidence threshold and empirical data of an adjusting value of a confidence value.

The second confidence value unit 303 is specifically configured to obtain, according to correspondence between the noise scenario and the empirical data pre-stored by the storage unit 306, an adjusting value of a confidence value corresponding to the noise scenario; and adjust the first confidence value according to the adjusting value of the confidence value, and obtain the second confidence value, where the adjusting includes: increasing, decreasing, and remaining unchanged.

The second confidence value unit 303 may be configured to execute the method described in steps S1031 and S1032 of Embodiment 3. For specific description, reference is made to the description of the method in Embodiment 3, which is not repeatedly described herein.

The technical solution of the present invention provides a voice identification apparatus. In the apparatus, the noise scenario is obtained, and the second confidence value is obtained according to the pre-stored empirical data of the adjusting value of the confidence value and the noise scenario. The apparatus that flexibly adjusts the confidence value according to the noise scenario greatly improves a voice identification rate under a noise environment.

Embodiment 5

Figure 9:
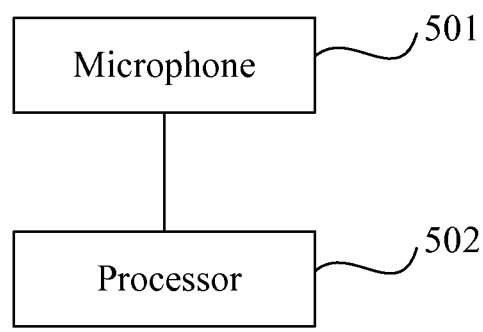
FIG. 9 is a schematic structural diagram of a mobile terminal according to Embodiment 5 of the present invention.

FIG. 9 is a schematic structural diagram of a mobile terminal according to Embodiment 5 of the present invention.

As shown in FIG. 9, the mobile terminal includes a processor and a microphone, where the microphone 501 is configured to obtain voice data; and the processor 502 is configured to obtain a first confidence value according to the voice data, obtain a noise scenario according to the voice data, obtain a second confidence value corresponding to the noise scenario according to the first confidence value, and if the second confidence value is greater than or equal to a pre-stored confidence threshold, process the voice data.

The microphone 501 and the processor 502 may be configured to execute the method described in steps S100, S101, S102, S103, and S104 of Embodiment 1. For specific description, reference is made to the description of the method in Embodiment 1, which is not repeatedly described herein.

The technical solution of the present invention provides a mobile terminal. In the mobile terminal, the noise scenario is obtained, and the second confidence value is obtained according to the pre-stored empirical data of the adjusting value of the confidence value and the noise scenario. The mobile terminal that flexibly adjusts the confidence value according to the noise scenario greatly improves a voice identification rate under a noise environment.

Optionally

Figure 10:
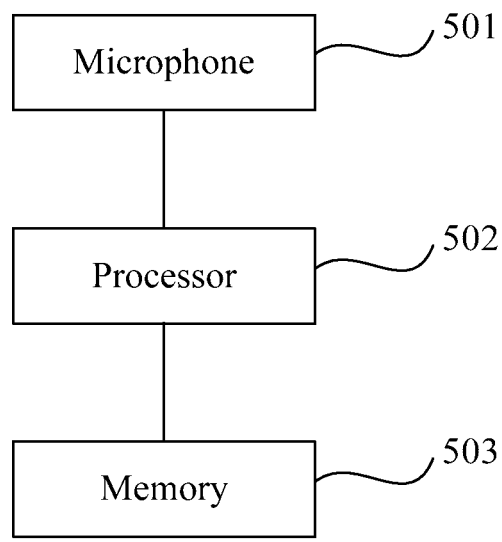
FIG. 10 is another possible schematic structural diagram of a mobile terminal according to Embodiment 5 of the present invention.

As shown in FIG. 10, the mobile terminal further includes a memory 503, configured to store empirical data of an adjusting value of a confidence value and the confidence threshold.

The processor 502 is specifically configured to obtain a noise scenario according to the voice data; obtain, according to correspondence between the noise scenario and the empirical data, an adjusting value of a confidence value corresponding to the noise scenario; adjust the first confidence value according to the adjusting value of the confidence value, and obtain the second confidence value; and if the second confidence value is greater than or equal to the confidence threshold, process the voice data.

The foregoing structure may be configured to execute the method in Embodiment 1, Embodiment 2, and Embodiment 3. For specific description, reference is made to the description of the method in Embodiment 1, Embodiment 2, and Embodiment 3, which is not repeatedly described herein.

The technical solution of the present invention provides a mobile terminal. In the apparatus, the noise scenario is obtained, and the second confidence value is obtained according to the pre-stored empirical data of the adjusting value of the confidence value and the noise scenario. The mobile terminal that flexibly adjusts the confidence value according to the noise scenario greatly improves a voice identification rate under a noise environment.

Embodiment 6

Figure 11:
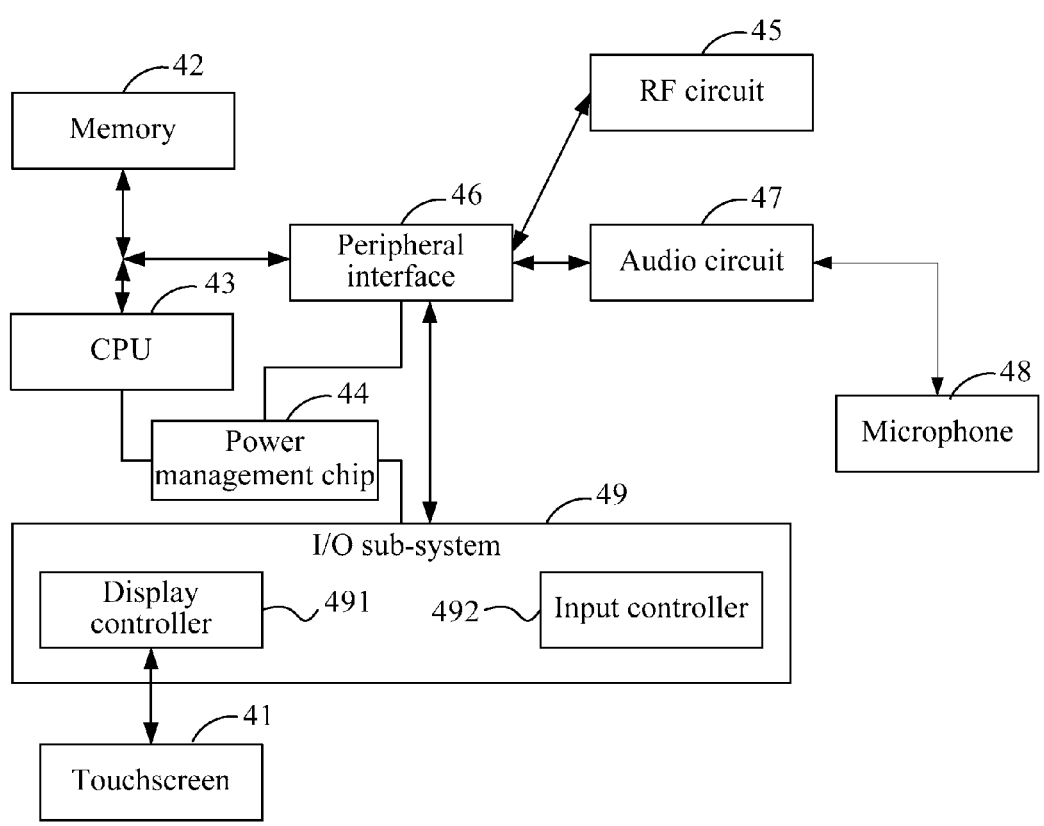
FIG. 11 is a schematic structural diagram of a mobile phone according to an embodiment of the present invention.

As shown in FIG. 11, in this embodiment, a mobile phone is taken as an example for specific description of the embodiment of the present invention. It should be understood that the mobile phone shown in the figure is only an example of the mobile phone, and the mobile phone may have more or fewer components than what is shown in the figure, may combine two or more components, or may have different component configurations. Various components shown in the figure may be implemented in hardware or software including one or more signal processing and/or dedicated integrated circuits, or a combination of hardware and software.

FIG. 11 is a schematic structural diagram of a mobile phone according to an embodiment of the present invention. As shown in FIG. 11, the mobile phone includes: a touchscreen 41, a memory 42, a CPU 43, a power management chip 44, an RF circuit 45, a peripheral interface 46, an audio circuit 47, a microphone 48, and an I/O sub-system 49.

The touchscreen 41 is an input interface and an output interface between the mobile phone and a user, and in addition to a function of obtaining touch information and a control instruction of the user, the touchscreen also displays visible output to the user, where the visible output may include a graph, a text, an icon, a video, and so on.

The memory 42 may be configured to store empirical data of an adjusting value of a confidence value and the confidence threshold, which is used by the CPU 43 during processing. The memory 42 may be accessed by the CPU 43 and the peripheral interface 46, and the memory 42 may include a high-speed random access memory, and may also include a non-volatile memory, for example, one or more magnetic disk storage devices and flash memory devices, or another volatile solid storage device.

The CPU 43 may be configured to process voice data obtained by the audio circuit 47 and the microphone 48, and obtain a noise scenario and a first confidence value according to the voice data; and adjust the first confidence value according to the noise scenario and the empirical data of the adjusting value of the confidence value pre-stored by the memory 42, and obtain a second confidence value. The CPU 43 is a control center of the mobile phone, connects each part of the entire mobile phone by using various interfaces and lines, and executes various functions of the mobile phone and processes data by running or executing software programs and/or modules stored in the memory 42 and invoking data stored in the memory 42, so as to perform entire monitoring on the mobile phone. Optionally, the CPU 43 may include one or more processing units; preferably, the CPU 43 may integrate an application processor and a modulating and demodulating processor. Optionally, the application processor mainly processes an operating system, a user interface, the application program, and so on, and the modulating and demodulating processor mainly processes wireless communication. It may be understood that the modulating and demodulating processor may be not integrated in the CPU 43. It should be further understood that the foregoing function is only one of functions that the CPU 43 can execute, and other functions are not limited in the embodiment of the present invention.

The power management chip 44 may be configured to perform power supply and power management for the CPU 43, the I/O sub-system 49, and the hardware connected to the peripheral interface 46.

The RF circuit 45 is mainly configured to establish communication between the mobile phone and a wireless network (that is, a network side), so as to implement data obtaining and sending of the mobile phone and the wireless network, for example, receiving and sending a short message and an e-mail. Specifically, the RF circuit 45 obtains and sends an RF signal, where the RF signal is also called an electromagnetic signal. The RF circuit 45 converts an electrical signal into an electromagnetic signal or converts an electromagnetic signal into an electrical signal, and performs communication with a communication network and another device through the electromagnetic signal. The RF circuit 45 may include a known circuit configured to execute the functions, where the circuit includes but is not limited to an antenna system, an RF transceiver, one or more amplifiers, a tuner, one or more oscillators, a digital signal processor, a CODEC chip-set, a subscriber identity module (Subscriber Identity Module, SIM), and so on.

The peripheral interface 46, may connect input and output peripherals of a device to the CPU 43 and the memory 42.

The audio circuit 47 may mainly be configured to obtain audio data from the peripheral interface 46, and convert the audio data into the electrical signal.

The microphone 48 may be configured to obtain the voice data.

The I/O sub-system 49: may control input and output peripheries on the device. The I/O sub-system 49 may include a display controller 491 and one or more input controllers 492 configured to control another input/control device. Optionally, one or more input controllers 792 obtain the electrical signal from another input/control device or send the electrical signal to another input/control device, where the another input/control device may include a physical button (a push button, a rocker button, and so on), a dial plate, a slide switch, a joystick, and a clicking wheel. It should be noted that the input controller 492 may be connected to any one of the following: a keyboard, an infrared port, a USB interface, and an indication device such as a mouse. The display controller 491 in the I/O sub-system 49 obtains the electrical signal from the touchscreen 41 or sends the electrical signal to the touchscreen 41. The touchscreen 41 obtains touch on the touchscreen, the display controller 491 converts the obtained touch into interaction with a user interface object on the touchscreen 41, that is, implements man-machine interaction, where the user interface object displayed on the touchscreen 41 may be an icon of running a game, an icon of connecting to a corresponding network, a filtering mode, and so on. It should be noted that the device may also include an optical mouse, where the optical mouse is a touch sensitive surface not displaying visible output, or is an extension of the touch sensitive surface formed by the touchscreen.

The microphone 48 obtains voice data of a large screen device, and sends the voice data to the CPU 43 through the peripheral interface 46 and the audio circuit 47. The CPU 43 may be configured to process the voice data, obtain a noise scenario and a first confidence value according to the voice data; and adjust the first confidence value according to the noise scenario and the empirical data of the adjusting value of the confidence value pre-stored by the memory 42, obtain a second confidence value, and if the second confidence value is greater than or equal to the pre-stored confidence threshold, process the voice data.

The foregoing structure may be configured to execute the method in Embodiment 1, Embodiment 2, and Embodiment 3. For specific description, reference is made to the description of the method in Embodiment 1, Embodiment 2, and Embodiment 3, which is not repeatedly described herein.

The technical solution of the present invention provides a mobile phone for voice identification. In the mobile phone, the noise scenario is obtained, and the second confidence value is obtained according to the pre-stored empirical data of the adjusting value of the confidence value and the noise scenario. The mobile phone that flexibly adjusts the confidence value according to the noise scenario greatly improves a voice identification rate under a noise environment.

Through the description in the foregoing embodiments, a person skilled in the art may be clearly aware that the embodiments of the present invention may be implemented by hardware, or be implemented by firmware, or be implemented by a combination of hardware and firmware. When the present invention is implemented by software, the foregoing functions may be stored in an apparatus readable medium, or be transmitted as one or more commands or code on the apparatus readable medium. The apparatus readable medium includes an apparatus storage medium and a communication medium. An optional communication medium includes any medium that facilitates transmission of an apparatus program from one place to another place. The storage medium may be any usable medium that an apparatus can access. The following is taken as an example but is not limited: The apparatus readable medium may include an RAM, an ROM, an EEPROM, a CD-ROM or another optical disc memory, a disk storage medium or another disk storage device, or any other medium that can be used to carry or store an expected program code in a command or data structure form and can be accessed by an apparatus. In addition, any connection may appropriately become an apparatus readable medium. For example, if the software implements transmission from a website, a server, or another remote source by using a coaxial cable, an optical cable, a twisted-pair cable, a digital subscriber line (DSL), or a wireless technology, such as infrared, radio, or microwave. Then, the coaxial cable, the optical cable, the twisted-pair cable, the DSL, or the wireless technology, such as infrared, radio, or microwave, is included in fixation of a home medium. For example, a disk (Disk) and a disc (disc) used in the embodiments of the present invention include a compact disc (CD), a laser disc, an optical disc, a digital versatile disc (DVD), a floppy disk, and a blue-ray disc. Generally, an optional disk magnetically duplicates data, while a disc optically duplicates data by using laser. A combination of the foregoing should also fall within the protection scope of an apparatus readable medium.

In conclusion, the foregoing description is merely embodiments of the present invention, but is not intended to limit the scope of the present invention. Any modifications, equivalent replacements, and improvements made within the spirit and principle of the present invention shall fall within the protection scope of the present invention.

What is claimed is:

1. A mobile terminal comprising:
    a microphone configured to obtain voice data;
    a non-transitory medium configured to store pre-established noise type models; and
    one or more processors configured to:
        determine a first confidence value in response to the voice data, the first confidence value being designated to be used for validating speech recognition processing result of the voice data;
        obtain a result value for each of the pre-established noise type models by inputting a frequency cepstrum coefficient of a noise in the voice data to each one of the pre-established noise type models;
        select a first pre-established noise type model which has a maximum result value for the voice data;
        determine a noise scenario associated with the first pre-established noise type model, wherein the noise scenario comprises a noise type, a signal-to-noise ratio and a noise level;
        determine an adjusting value based on the noise scenario;
        determine a second confidence value by adjusting the first confidence value based on the determined adjusting value, the second confidence value being designated to be used for validating speech recognition processing result of the voice data; and
        perform an operation in accordance with the speech recognition processing result of the voice data in a case that the second confidence value being greater than or equal to a confidence threshold without considering whether the first confidence value being greater than or equal to the confidence threshold;
    wherein the adjusting value is between 15 and 5 when the noise type is an on-board environment, when the noise level is smaller than −30 dB and when the signal-to-noise ratio is smaller than 10 dB; and
    wherein the adjusting value is between 10 and 3 when the noise type is an on-board environment, when the noise level is greater than −30 dB and smaller than −40 dB and when the signal-to-noise ratio is greater than 10 dB and smaller than 20 dB.

2. The mobile terminal according to claim 1, wherein the pre-established noise type mode is established by:
    obtaining noise data;
    obtaining a frequency cepstrum coefficient of the noise data; and
    processing the frequency cepstrum coefficient of the noise data according to an Expectation-maximization algorithm.

3. The mobile terminal according to claim 2, wherein the pre-established noise type mode is a Gaussian mixture model.

4. The mobile terminal according to claim 1, wherein the noise type corresponds to the first pre-established noise type model, and the one or more processors, further configured to:
    obtain a feature parameter of the voice data;
    perform voice activity detection based on the feature parameter of the voice data; and
    obtain the noise magnitude based on a result of the voice activity detection.

5. The mobile terminal according to claim 1, the one or more processors, further configured to:
    prompt a user when the second confidence value is smaller than the confidence threshold.

6. A voice identification method performed by a mobile terminal, the method comprising:
    obtaining voice data;
    determining a first confidence value in response to the voice data, the first confidence value being designated to be used for validating speech recognition processing result of the voice data;
    obtaining a result value for each of the pre-established noise type models by inputting a frequency cepstrum coefficient of a noise in the voice data to each one of the pre-established noise type models;
    selecting a first pre-established noise type model which has a maximum result value for the voice data;
    determining a noise scenario associated with the first pre-established noise type model wherein the noise scenario comprises a noise type, a signal-to-noise ratio and a noise level;
    determining an adjusting value based on the noise scenario;
    determining a second confidence value by adjusting the first confidence value based on the determined adjusting value, the second confidence value being designated to be used for validating speech recognition processing result of the voice data; and
    performing an operation in accordance with the speech recognition processing result of the voice data in a case that the second confidence value being greater than or equal to a confidence threshold without considering whether the first confidence value being greater than or equal to the confidence threshold;
    wherein the adjusting value is between 15 and 5 when the noise type is an on-board environment, when the noise level is smaller than −30 dB and when the signal-to-noise ratio is smaller than 10 dB,
    wherein the adjusting value is between 10 and 3 when the noise type is an on-board environment, when the noise level is greater than −30 dB and smaller than −40 dB and when the signal-to-noise ratio is greater than 10 dB and smaller than 20 dB.

7. The method according to claim 6, wherein the pre-established noise type mode is established by:
    obtaining noise data;
    obtaining a frequency cepstrum coefficient of the noise data; and
    processing the frequency cepstrum coefficient of the noise data according to an Expectation-maximization algorithm.

8. The method according to claim 7, wherein the pre-established noise type mode is a Gaussian mixture model.

9. The method according to claim 6, wherein the noise type corresponds to the first pre-established noise type model, and the method further comprising:
   obtaining a feature parameter of the voice data;
   performing voice activity detection based on the feature parameter of the voice data; and
   obtaining a noise magnitude based on a result of the voice activity detection.

10. The method according to claim 6, further comprising:
   prompting a user when the second confidence value is smaller than the confidence threshold.

* * * * *